United States Patent Office 3,562,712
Patented Feb. 9, 1971

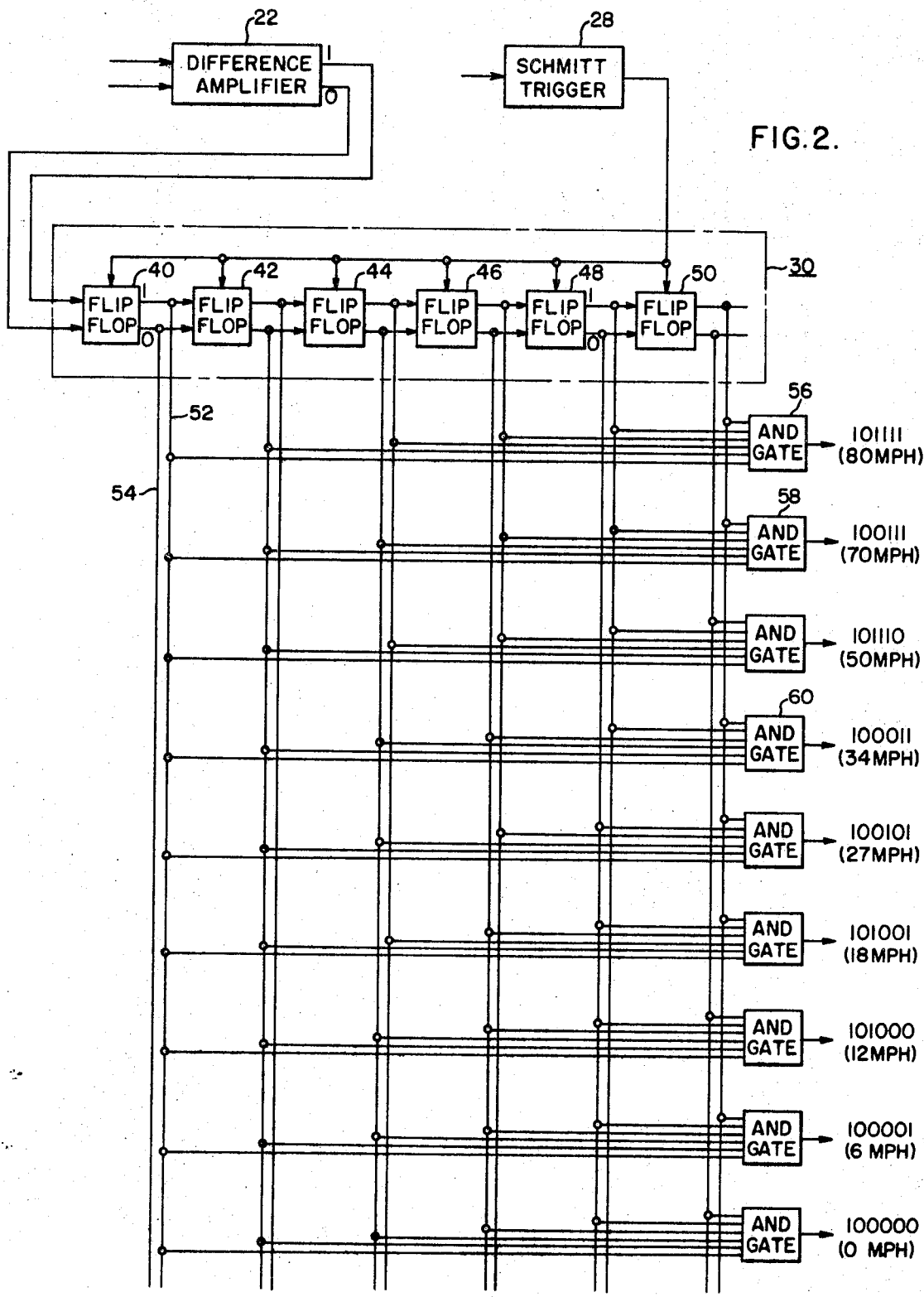

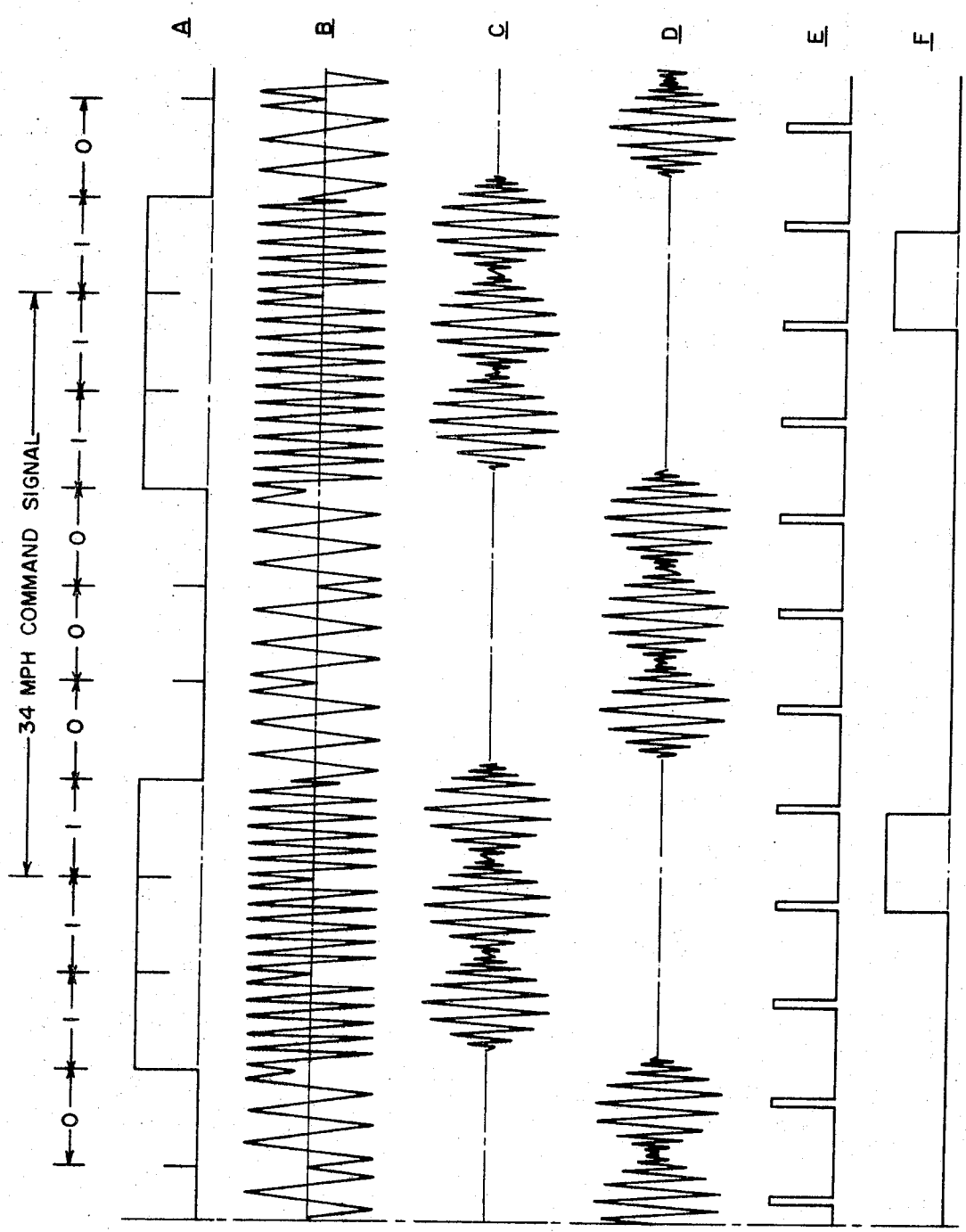

3,562,712
REMOTE TRANSMISSION OF CONTROL SIGNALS
George M. Thorne-Booth, Murrysville, Pa., and Chauncey S. Miller, Concord, Mass., assignors to Westinghouse Electric Corporation, Pittsburgh, Pa., a corporation of Pennsylvania
Filed May 11, 1967, Ser. No. 637,723
Int. Cl. H04q 9/00
U.S. Cl. 340—168
6 Claims

ABSTRACT OF THE DISCLOSURE

The remote transmission of control signals for the particular application to control the performance of a moving train vehicle or the like requires a very high degree of fail-safe control system operation. The apparatus here described in the event of any component failure is designed to revert to a predetermined and lower priority command signal condition of operation. Any such component failure, for example during speed control of the train, is designed to cause a signal interpretation to occur such that a lower than desired speed will result or the vehicle will receive a command to stop since human life and property are involved. The control signals are binary coded in a serial coding arrangement which requires no separate synchronization of receiver equipment, and special signal filters are provided to have a high probability of failing to the mode of a lower priority output signal or no output signal for either internal or external fault conditions. A frequency modulated signal is transmitted from the remote location wayside transmitter to the vehicle, said signal having first and second frequencies corresponding to the binary command information to be transmitted. A vehicle-carried receiver separates the binary command information into a repetitive comma free command signal which is converted by a logic matrix circuit into the desired vehicle command signal information. A fail-safe coupling of this signal to the desired operation control device is now accomplished to assure the desired safe operation of the vehicle.

CROSS-REFERENCE TO RELATED APPLICATIONS

The present patent application is related to a copending patent application by C. S. Miller entitled "Remote Signaling of Control Signals" Serial No. 637,683, filed May 11, 1967 which is assigned to the same assignee as is the present patent application.

BACKGROUND OF THE INVENTION

In the operation of a mass transit oriented system, train vehicle command signals are required between the train and a provided remote control apparatus, and it is desired to effect precise control of one or more individual trains with a minimum of train carried equipment. The train control signal transmission practice must be fail-safe in relation to any equipment failure and not result in providing a constant value output signal to indicate safe operation for the train.

SUMMARY OF THE PRESENT INVENTION

A frequency modulated and binary coded command signal is received and separated by a receiver carried by the train vehicle to be controlled from the remote wayside station location. The binary coding is in accordance with a comma free code and the receiver operates to provide the desired train control information in a fail-safe manner. Any equipment failure or signal transmission failure will result in an improper signal repetition or sequence and cause one of a lower priority command signal to be supplied to the train control equipment or will cause the train to stop its programmed control operation.

In accordance with the teachings of the present invention a fail-safe signal coupling circuit arrangement is provided between the train carried command signal receiver and the wayside train controlling signal transmitting equipment. This circuit is designed for pulse signal coupling only with substantial impossibility for any non-pulse signals to be coupled from the input to the output of this circuit. This assures fail-safe operation of the train control since an unwanted command signal will not be provided to operate the train control apparatus, and the vast built-in likelihood is that any unwanted command signal will provide no output signal, in which case the train will be stopped.

BRIEF DESCRIPTION OF THE DRAWINGS

FIG. 2 shows one suitable embodiment of the binary coded signal decoding circuit portion of the receiver carried by the train vehicle;

FIG. 3 consisting of curves a through f shows the signal waveforms obtained at various locations within the receiver shown in FIGS. 1 and 2;

Figures 1, 5, 6, 7:
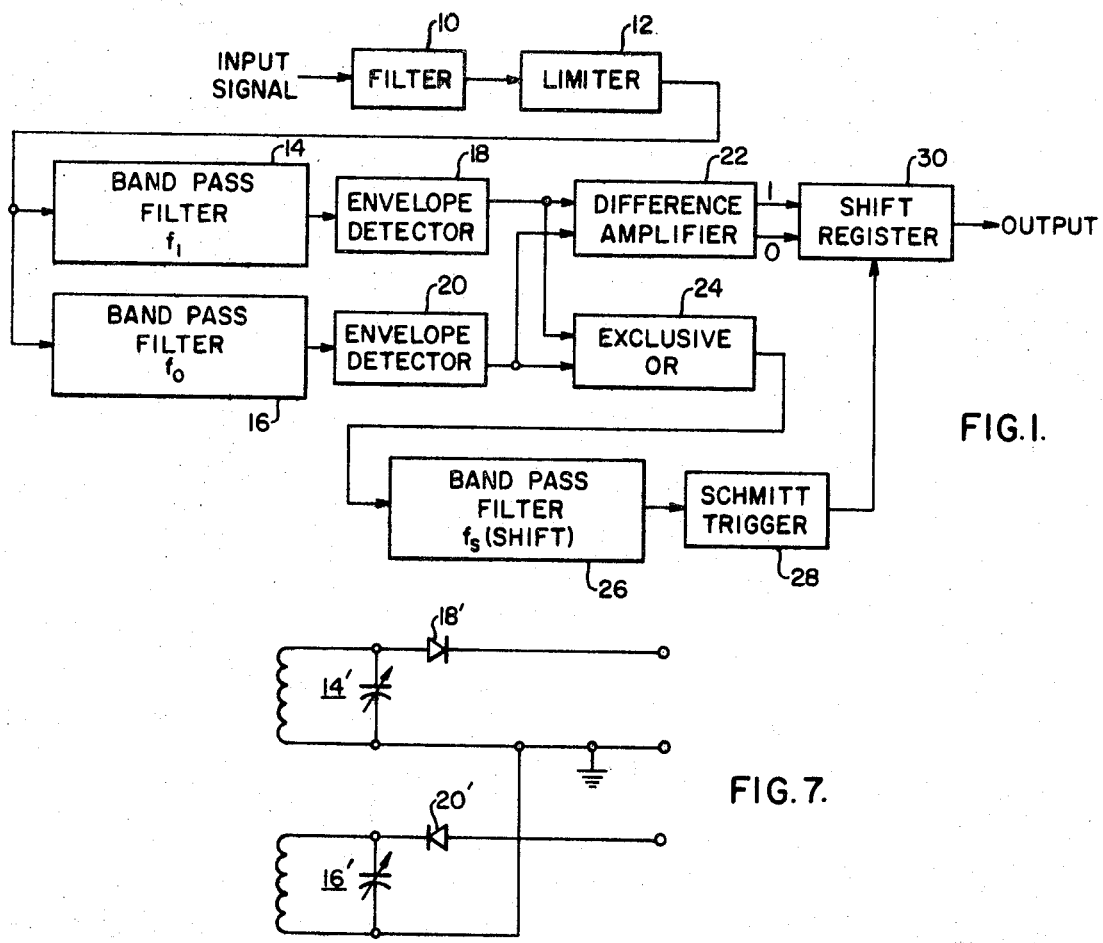
FIG. 1 shows the train vehicle carried receiver to be utilized in the practice of this invention.
FIG. 5 shows in greater detail a typical one of the bandpass filters shown in FIG. 4.
FIG. 6 shows the signal frequency versus current relationship provided by the filter circuit shown in FIG. 5.
FIG. 7 illustrates a suitable bandpass filter and envelope detector circuit arrangement.

It is an object of the present invention to provide a communication system for the remote transmission of control signals, which for any possible component failure or combination of failures will revert to a predetermined safe operation condition. This is generally applicable for many data links but especially for process control and for the remote control of a moving train vehicle. In accordance with the present invention a serial coding system is employed using code words composed of a number of symbols. As each symbol is received after appropriate demodulation it is inserted into a memory device, such as a shift register, with a capacity equal to the number of symbols in the desired word length. Word synchronization of the signals is not employed since incorrect synchronization could cause the signals to be received erroneously which in the case of train vehicle carried control equipment could lead to dangerous operation of the train. By use of a comma free code an output command signal is obtained only when all of the binary symbols of a particular code word have been received and are present in the memory, regardless of the synchronization and regardless of the sequence of words transmitted. For example, consider a six bit binary code from which several independent comma free words can be obtained. If the code words are not required to be independent or if the number of bits is increased a larger number of comma free words can be utilized. Each received bit is inserted into the shift register in sequence. At the output of the shift register are a plurality of six-input AND gate circuits having their inputs connected in a predetermined and desired manner to the respective set of reset outputs of the successive shift register stages corresponding respectively to the ones and zeros of the particular code word stored in the shift register. Due to the comma free character of the code, the output pulse at an AND gate output exists only for the duration of one bit interval when the correct and selected six bit sequence for a given word is present and stored in the shift register. If a given word is transmitted a number of times sequentially, the output of the appropriate and selected AND gate will be a series of pulses of one to five mark to space ratio. If this series of pulses is fed into a bandpass filter which is designed to pass the fundamental frequency only of the series of pulses, the output of the filter will be in general a sine wave. The sine wave output of the filter may be used directly or rectified with a diode. The fail-safe reversion to a known safe mode or no output signal condition of operation is dependent upon the manufacture of the bandpass filter. If transformers are used in the construction, including toroid rings in which the toroid is an insulating ferrite material and in which the primary and secondary are physically separated and the whole transformer than encapsulated, it is substantially fail-safe to assure that a D-C voltage cannot appear at the final diode output unless the series of pulses at the correct frequency has been applied to the input of the bandpass filter, particularly if a D-C voltage having a desired predetermined threshold value is desired. Therefore, no component failure which puts a permanent D-C voltage on the AND gates can cause erroneous signal detection and electrical noise would have to exhibit the unlikely property of reproducing one of the code words at the correct repetition frequency for a sufficient number of sequential periods in order to provide an erroneous output from the relatively narrow bandpass filter having a magnitude adequate to energize the connected train control output load device.

The probability of the required unique noise signal pattern occurring more than once is very remote and more than twice is extremely remote. A single or even double occurrence of such a noise pattern would cause no serious disturbance to the desired train control operation, due to the hysteresis in the operation of the bandpass filters and the connected threshold response of the train control load device.

It is desired in accordance with the present invention to provide a signaling technique for the transmission of a number of command signals to a train vehicle, such that in the case of any apparatus component failure a more restricted command signal to the train vehicle results thus achieving fail-safe operation for particular applications to the control of a train vehicle where human life and property safety are involved.

A predetermined sequential signaling system is used such that the reception of a certain repetitive sequence of binary signals is required for the communication of a train command. The commands to be sensed are arranged in ascending order in relation to the risk involved in executing each command such as is generally shown in FIG. 2 of the drawings. A binary word is assigned for each command signal, with the command signal involving the greatest risk or 80 m.p.h. operation being assigned the number most likely to be difficult to transmit, whereas the command signal involving the next greatest risk or 70 m.p.h. operation is assigned the next most difficult member to transmit and so on.

As shown in FIG. 2 for illustration of a typical train control system, there are nine desired command signals and each command signal word is composed of six bits. The control apparatus employs a shift register of adequate length to store the six bits of each word and operative such that only a single bit can be stored in each flip-flop stage as the total of six bits is sequentially shifted through the register.

It has been determined that the most likely failure in the coupling circuits would be such that an output binary ONE signal from a given flip-flop stage is prevented from appearing at the output of the succeeding stage and would result in a ZERO appearing at the output of the succeeding stage to give a lower binary number which calls for a more restrictive command. Any failure of any equipment to cause a sequence of all binary ONES or all binary ZEROS to appear at the respective outputs of the flip-flop stages is fail-safe since this combination of binary bits is not included in the provided speed command signals shown in FIG. 2 and the subsequent train control devices would interpret such a command signal to cause a stopping of the train and therefore would be fail-safe. An intermittent failure will merely cause an interruption of signal transmission or a more restrictive command, since the failure would have to produce a predetermined sequence of binary bits periodically, with a period exactly equal to the period of the shift register before it would be mistaken for a valid command. This assures fail-safe operation of the signal transmission system. The speed command words are chosen so that any equipment failure which causes binary ONES to be replaced with binary ZEROS results in a more restrictive command or a sequence not included in the set of command words, which like all binary ONES and all binary ZEROS is fail-safe. Therefore, in this unique application with a signal transmission system for speed command signals to a moving train vehicle, if any equipment failure occurs a command for a reduced speed condition results which allows continued safe train operation and if a failure causes the communications to be interrupted or all binary ONES or all binary ZEROS to be sensed the vehicle can be made to interpret this as an emergency stop command.

The advantage of the present invention, particularly for the remote control of a moving vehicle, is that it provides a data link that for any component failure or interruption will interpret the result as a command for the vehicle to stop, since life and property are involved in the operation of the controlled train vehicle. Serial coding has advantages from an equipment manufacturing standpoint and in this present system all of the stress on safety is placed upon the bandpass filters which can be readily designed to have an extremely high probability of failing to the mode of no output for either internal or external faults.

FIG. 1 illustrates the train vehicle carried receiver including a filter 10 into which the train command signal transmitted from the wayside transmitter is applied for removing noise or interference at frequencies outside the bandwidth of interest. After being filtered, the command signal is then passed through a limiter 12 which provides an output of constant amplitude. This constant amplitude signal is now applied to each of two parallel connected narrow bandpass filters 14 and 16 having equal bandwidths, with the filter 14 having a center frequency $f_1$ corresponding to the transmitted binary ONE bit signal and the other filter 16 having a center frequency $f_0$ corresponding to the transmitted binary ZERO bit signal. The output signal from the filter 14 having a center frequency $f_1$ is applied to an envelope detector circuit 18, as is the output signal from the filter 16 having a center frequency $f_0$ applied to an envelope detector 20. The output signal from the respective envelope detectors 18 and 20 are now applied to the respective inputs of a difference amplifier 22 which provides a ONE output signal if the detected signal from the filter 14 tuned to $f_1$ is greater than the detected signal from the filter 16 tuned to $f_0$ and provides a ZERO output signal if the reverse situation occurs. Since the ONE or ZERO signals depend upon the relative amplitudes of the applied input signals and not the actual value, a maximum likelihood of the correct signal detection is achieved. Since the difference amplifier 22 is symmetric in its operation, complemented logic levels are available for the inputs to the shift register 30. The outputs of the two envelope detectors 18 and 20 are also applied to an EXCLUSIVE OR circuit 24 which provides the bit rate synchronization pulse for the operation of the shift register 30, which signal is periodic having a period $T_s$ and a frequency component $f_s$ regardless of the sequence of applied ones and zeros. The output of the EXCLUSIVE OR circuit 24 is passed through a narrow bandpass filter 26 and a Schmitt trigger circuit 28, which converts the sine wave at the filter output to a square wave suitable for driving the shift line of the shift register 30 at the desired bit rate in synchronization with the application of the respective binary one or binary zero output signal from the difference amplifier 22. The signal delay provided by the bandpass filter 26 and Schmitt trigger circuit 28 is adjusted such that the respective binary output signals from the difference amplifier 22 are properly entered into the shift register 30 at the end of each respective signaling interval $T_s$ when the difference in the envelope detector outputs is a maximum. Since this shift control pulse is derived from the same input waveform, no additional synchronization information is needed.

In FIG. 2 there is shown the respective binary output signals from the difference amplifier 22 being supplied to the inputs of the shift register 30 such that the binary output signal from the difference amplifier 22 is first inserted into the first stage flip-flop 40, and is sequentially shifted through the succeeding flip-flop stages 42, 44, 46, 48 and 50, one stage each time that a shift pulse is received from the Schmitt trigger circuit 28. When a binary ONE signal is stored in the flip-flop stage 40, the ONE output of that flip-flop stage 40 is energized such that conductor 52 is energized with a binary ONE signal. On the other hand, when a binary ZERO signal is stored in the flip-flop stage 40, the conductor 54 is energized with a control signal. This is true for the operation of the succeeding flip-flop stages 42, 44, 46, 48 and 50 such that when there is stored in the respective flip-flop stages the 80 mile per hour command signal 101111, and only when such a grouping of signals is stored, only the AND gate 56 will provide a pulse output signal each time interval that this exact signal arrangement is stored in the shift register. If the difference amplifier 22 continuously and sequentially supplies this arrangement of signals to the shift register 30, there will appear within the shift register this particular grouping of binary signals once for each six shift operations of the shift register 30. Similarly, when the difference amplifier is providing the 70 mile per hour command signal 100111, this 70 mile per hour command signal will be properly stored in the shift register once for each six shift operations of the shift register 30 and for that one storage condition the AND gate 58 will provide an output signal. In a similar manner for the other illustrated comma free binary coded six bit words shown in FIG. 2, when the command signal is stored in the shift register 30 the proper and corresponding AND gate will provide a pulse output signal.

FIG. 3 shows the signal waveforms obtained for the 34 mile per hour command signal operation of the receiver circuit shown in FIGS. 1 and 2. Curve A shows the 34 mile per hour command signal; curve B illustrates the output signals from the filter 10 and limiter 12; curve C illustrates the output signal from the bandpass filter 14; curve D illustrates the output signal from the bandpass filter 16; and curve E illustrates the output signal from the Schmitt trigger circuit 28. The AND logic gate 60 shown in FIG. 2 will have the output signal shown in curve F, providing a pulse signal each time that the predetermined arrangement of binary ONES and ZEROS corresponding to the 34 mile per hour command signal 100011 is stored in the respective flip-flop stages 40, 42, 44, 46, 48 and 50.

Figure 4:
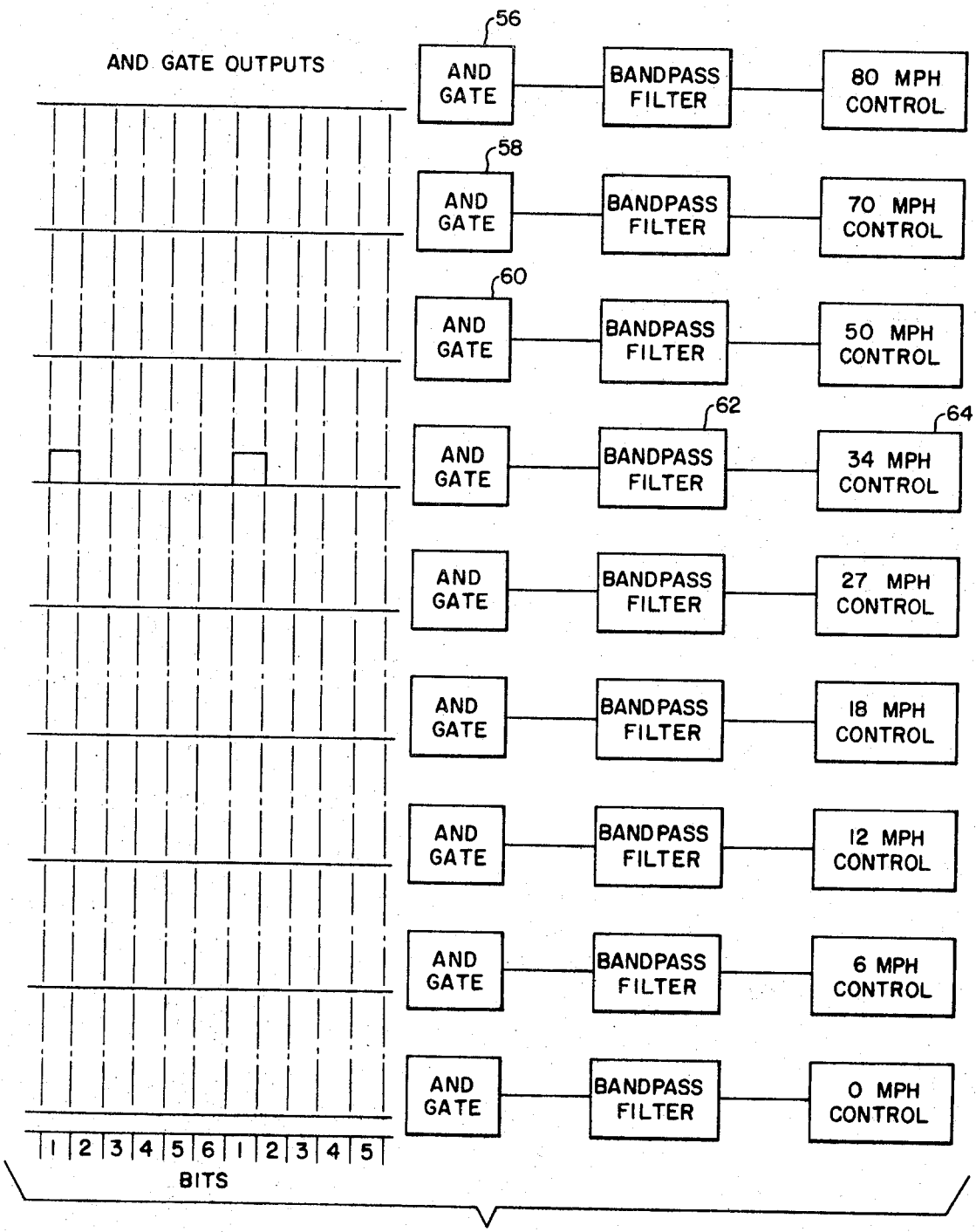
FIG. 4 shows the bandpass filters coupling the decoding matrix logic AND gates to their respective train operation control load devices.

In FIG. 4 there are shown the bandpass filters coupled between the coding matrix logic AND gates and the respective train operation control load devices. More specifically, the AND gate 62 for the 34 mile per hour command signal 100011 shown in FIG. 3 is shown supplying its output signal to bandpass filter 62 which in turn energizes the 34 mile per hour train control 64 which may be a signal threshold responsive relay load device. It should be understood that the latter 34 mile per hour control device can be designed to have a minimum predetermined signal threshold energization level; for example, if it is a relay coil, it can be designed to have an A-C reactance characteristic to keep the net current through the relay coil down in the event that an undesired A-C signals happens to be supplied to the relay coil, whereas for a D-C signal a substantially higher current at the tuned frequency of the bandpass filter 62 would be provided to cause the relay to be operated for the D-C current and not for an undesired A-C current. This can be better understood in reference to FIG. 5 which shows in greater detail a typical bandpass filter, such as the bandpass filter 62 shown in FIG. 4.

In FIG. 5 there is shown a toroid 70, which can be made of insulating ferrite, is provided onto which is wound an input winding 72 and an output winding 74, with the toroid 70 and the input winding 72 and the output winding 74 being adapted for encapsulation within a suitable plastic material 76 which is nonconductive. The bandpass filter 62 can be tuned by means of variable capacitors 78 and 80 to provide a desired and per se well known load current versus frequency characteristics as shown in FIG. 6. A diode 82 shown in FIG. 5 is provided to rectify the signal from the output winding 74 before it is supplied to a load 84, which can be the 34 mile per hour control 64 previously discussed. The operation of the bandpass filter 62 shown in FIGS. 4 and 5 is such that when a series of pulses is fed to this filter, which is designed to pass only the fundamental frequency of the series of pulses, the output of the filter will be a sine wave. The sine wave output of the filter 62 is rectified by the diode 82 and is then applied to the load 84.

In FIG. 7 there is shown bandpass filters 14' and 16' and the envelope detectors 18' and 20' which are suitable for operation as an embodiment for the corresponding elements of FIG. 1.

While the present invention has been described with a certain degree of particularity, it should be understood that various modifications and changes thereof can be made within the spirit and scope of the present invention.

We claim as our invention:

1. In receiver apparatus for controlling the operation of a device;
   (a) signal means having an output channel and providing a repetitive signal sequence serially communicated through said output channel to represent at least one desired operation condition of said device;
   (b) said repetitive signal sequence comprising a predetermined number of successive first and second signals, each first signal having one coding characteristic and each second signal having another coding characteristic, said signal sequence being repeated at predetermined time intervals,
   (c) serial signal storage means having a series of storage stages, equal to the number of signals in said signal sequence, said output channel being operative to direct the successive first and second signals sequentially through said series of storage stages,
   (d) signal decoding means operative to provide a control pulse signal for each occurrence of at least one predetermined group of said first and second signals in said series of storage stages,
   (e) control means operative with said device for controlling the condition of operation of the device in response to said control pulse signal, and
   (f) selective coupling means connected between said decoding means and said control means and operative to pass only repetitive control pulse signals having time intervals approximately equal to said predetermined interval of the signal sequence serially communicated through said output channel and operative to block pulse signals having time interval values above and below said predetermined time intervals.

2. Apparatus in accordance with claim 1, with:
(g) said selective coupling means comprising a band pass filter having a center frequency corresponding to the rate of repetition of said signal sequences.

3. Apparatus in accordance with claim 2, with:
(h) threshold circuit means connected between said selective coupling means and said control means for blocking control pulse signals unless the output signal from the band pass filter exceeds a predetermined minimum signal level.

4. Apparatus in accordance with claim 1 in which said selective coupling means comprises:
(i) a tuned input circuit tuned to the rate of repetition of said signal sequence,
(j) a tuned output circuit tuned to the rate repetition of said signal sequence, and
(k) magnetic means for coupling said input and output circuits.

5. Apparatus in accordance with claim 4, with:
(l) said tuned output circuit being operative with a threshold circuit means for blocking an output from said selective coupling means unless the signal level in said tuned output circuit exceeds a predetermined minimum threshold.

6. Apparatus in accordance with claim 5, with:
(m) said tuned output circuit including a rectifier means to provide a D.C. output signal from said selective signal coupling means,
(n) said threshold circuit means being further operative to block any fluctuating signal component regardless of its signal level.

References Cited
UNITED STATES PATENTS

| | | | |
|---|---|---|---|
| 3,069,657 | 12/1962 | Green, Jr., et al. | 340—171 |
| 2,645,771 | 7/1953 | Labin | 325—37UX |
| 3,378,817 | 4/1968 | Vitt | 325—64X |

DONALD J. YUSKO, Primary Examiner

M. SLOBASKY, Assistant Examiner

U.S. Cl. X.R.
340—167, 171